United States Patent
Ichiba

(10) Patent No.: US 8,002,659 B2
(45) Date of Patent: Aug. 23, 2011

(54) TRANSMISSION BELT AND INDICATION APPARATUS FOR INDICATING THE END OF LIFE OF TRANSMISSION BELT

(75) Inventor: Hiroyuki Ichiba, Nara (JP)

(73) Assignee: The Gates Corporation, Denver, CO (US)

( * ) Notice: Subject to any disclaimer, the term of this patent is extended or adjusted under 35 U.S.C. 154(b) by 522 days.

(21) Appl. No.: 10/525,159

(22) PCT Filed: Aug. 22, 2003

(86) PCT No.: PCT/JP03/10612
§ 371 (c)(1),
(2), (4) Date: Jun. 5, 2007

(87) PCT Pub. No.: WO2004/018900
PCT Pub. Date: Mar. 4, 2004

(65) Prior Publication Data
US 2007/0265123 A1    Nov. 15, 2007

(30) Foreign Application Priority Data
Aug. 22, 2002    (JP) ............... P2002-241676

(51) Int. Cl.
*F16G 1/00*    (2006.01)
(52) U.S. Cl. ........ 474/237; 474/205

(58) Field of Classification Search .......... 474/102, 474/106, 152, 237–272, 205; 73/7, 8
See application file for complete search history.

(56) References Cited

U.S. PATENT DOCUMENTS

| | | | |
|---|---|---|---|
| 6,569,046 B1 * | 5/2003 | Gregg | 474/106 |
| 6,672,983 B2 * | 1/2004 | Mohr et al. | 474/152 |

FOREIGN PATENT DOCUMENTS

| | | | |
|---|---|---|---|
| EP | 0767509 A1 | * | 4/1997 |
| GB | 2046399 | * | 11/1980 |
| JP | 103434/1983 | | 1/1985 |
| JP | 05248496 A | * | 9/1993 |
| JP | 6-280943 | | 10/1994 |
| JP | 6-281517 A | * | 10/1994 |
| JP | 9-242826 | | 9/1997 |
| JP | 9256865 | * | 9/1997 |

* cited by examiner

*Primary Examiner* — Robert Siconolfi
*Assistant Examiner* — Vu Q Nguyen
(74) *Attorney, Agent, or Firm* — P.N. Dunlap, Esq.; J.A. Thurnau, Esq.; T.A. Dougherty, Esq.

(57) ABSTRACT

A transmission belt (10) has a contact face (18*a*) which contacts a pulley when the belt (10) is wound around the pulley. Foreign matter (25) is embedded near the contact face (18*a*) in the belt (10). The contact face (18*a*) is worn by the pulley when the belt (10) rotates around the pulley, so that the foreign matter (25) is exposed at the contact face (18*a*). The foreign matter (25) contacts the pulley to make a warning sound. Due to this, a user of the belt (10) can determine the extent of the wear of the belt (10), and the decrease in the transmissibility of the belt (10) and the pulley.

10 Claims, 6 Drawing Sheets

TRANSMISSION BELT AND INDICATION APPARATUS FOR INDICATING THE END OF LIFE OF TRANSMISSION BELT

TECHNICAL FIELD

The present invention relates to a transmission belt which can warn of the approach of the end of its life, and it relates to an indication apparatus which can indicate the end of life of a transmission belt.

BACKGROUND ART

Conventionally, after using a transmission belt for a long time, the belt body of the transmission belt is worn and the transmission belt is cracked at the surface due to hardening of the rubber of the belt. When the wear and the cracking of the transmission belt are advanced, the transmission belt can break at a tooth or another place, and the transmission power of the belt on a pulley can decrease remarkably or be lost. Therefore, the transmission belt needs to be exchanged before it is worn out or cracked.

However, wear or cracking of a transmission belt can not be easily recognized. Therefore, it is difficult to determine when the transmission belt will cease to transmit power, or by what amount the transmission power has decreased due to wear.

For example when a toothed belt is used for cam belt in a vehicle, the toothed belt is provided inside the engine therefore the wear and cracking of the toothed belt can not be checked. Namely, it is difficult to know when the transmission belt should be changed.

Therefore, as shown in Japanese Unexamined Utility Model Publication (KOKAI) NO. 60-12747, an apparatus composed of an electric circuit is shown, which warns when a transmission belt has reached the limit of its useful life. But the composition of this apparatus is very complex and it is difficult to put it to practical use.

DISCLOSURE OF INVENTION

Therefore, an object of the present invention is to provide a transmission belt which warns of a decrease in the transmission power of the transmission belt on a pulley, and to provide an indication apparatus which easily indicates the end of life of a transmission belt.

A transmission belt according to the present invention comprises a contact face contacting with a pulley so that the transmission belt is wound around the pulley, and foreign matter embedded near the contact face in the transmission belt. The contact face is worn by the pulley when the transmission belt rotates around the pulley, so that the foreign matter is exposed at the contact face so as to warn of a decrease in the transmission power of the transmission belt on the pulley.

Due to this, the user of the transmission belt can change the transmission belt before the belt becomes unreliable.

When the foreign matter contacts the pulley, a warning sound is generated to warn of the decrease in transmission power. Due to this, the user can determined if there is a decrease in transmission power, without seeing the transmission belt itself.

The foreign matter is softer than the pulley. Due to this, the pulley is not scratched by the foreign matter when the decrease in the transmission power is being indicated.

The longitudinal direction of the foreign matter is a perpendicular direction to the contact face. Further, the width of the foreign matter becomes narrower as the foreign matter approaches the contact face. Due to this, the extent of the wear of the belt can be determined by the user.

If a plurality of pieces of the foreign matter are embedded in the transmission belt and the distance between the contact face and at least one of the pieces of the foreign matter is different from the distance between the contact face and the other pieces of the foreign matter, the extent of the wear of the belt can be grasped more correctly.

If the user wants to determine the extent of wear by using the naked eye, the foreign matter is given a color which is different from a color of other parts of the transmission belt, the other parts being the facing fabric or the rubber layer etc.

The foreign matter contacts the pulley whereby a warning sound having a specific frequency is generated.

A transmission belt according to the present invention comprises a belt body, which is made of a predetermined material, having a certain thickness, and a foreign matter, which is made of different material from the predetermined material, embedded in the belt body. The predetermined material is for example a rubber and a fabric, and the material of the foreign matter is a metal or a plastic etc. In this belt, a distance from the foreign matter to a first surface of the belt body in the thickness direction is shorter than a distance from the foreign matter to a second surface of the belt body in the thickness direction. The first surface is the contact face and the second surface is at the opposite side to the contact face.

An indication apparatus for indicating the end of life of a transmission belt according to the present invention comprises a pulley and a transmission belt that is wound around the pulley.

The transmission belt has a contact face contacting the pulley when the transmission belt is wound around the pulley, and foreign matter embedded near the contact face in the transmission belt. The contact face is worn by the pulley when the transmission belt rotates around the pulley, so that the foreign matter is exposed at the contact face whereby the foreign matter contacts the pulley to make a specific sound.

The indication apparatus further comprises a sound sensor, which detects the specific sound, set up near where the transmission belt contacts the pulley, and a warning apparatus which sends out a warning according to the specific sound detected by the sound sensor.

The foreign matter contacting the pulley at a predetermined cycle makes a specific sound appear at that predetermined cycle when the transmission belt rotates at a predetermined speed.

The warning apparatus sends out a warning when the specific sound appears at the predetermined cycle.

BEST MODE FOR CARRYING OUT THE INVENTION

Embodiments of the present invention will be described with reference to the drawings.

Figure 1:
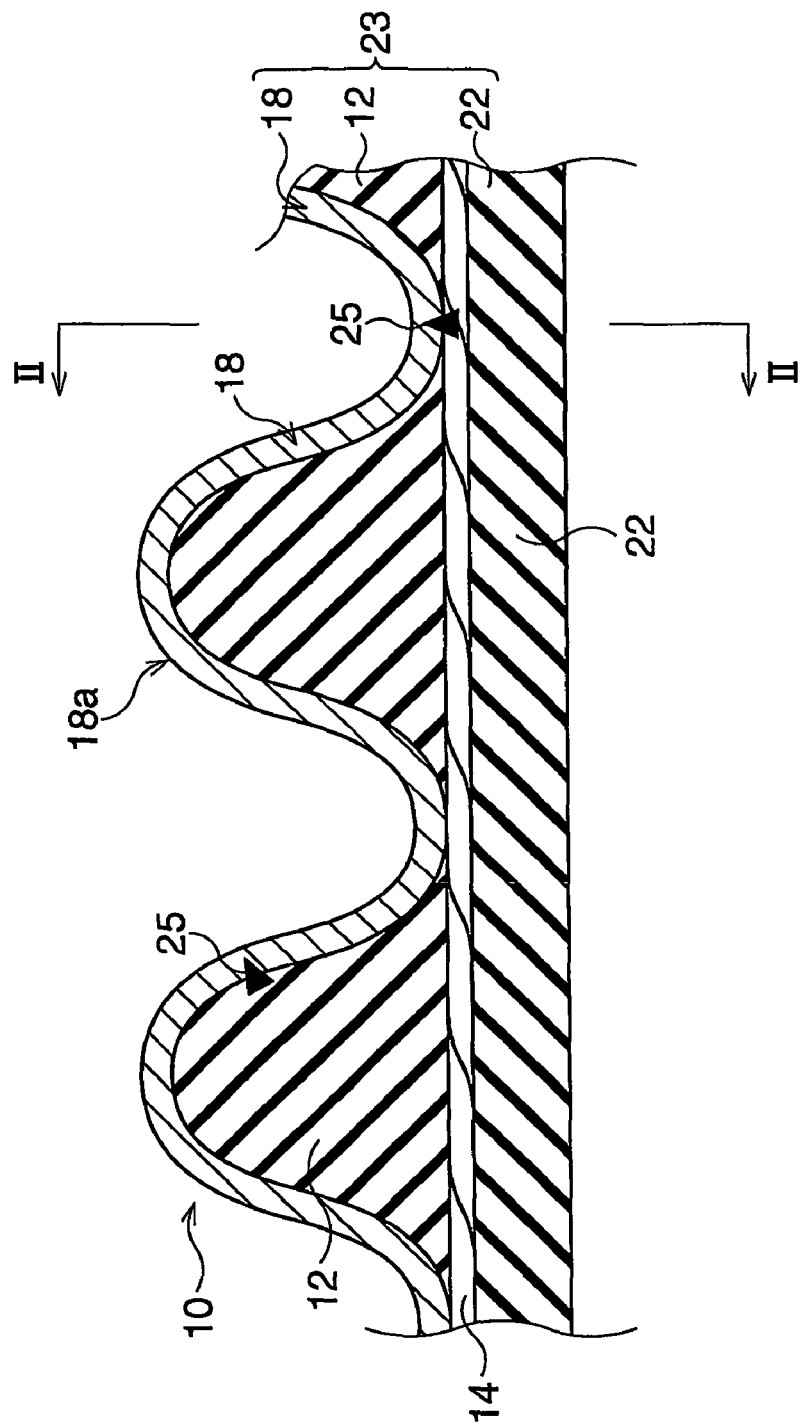
FIG. 1 is a partial side view of the toothed belt in a first embodiment according to the present invention.

FIG. 1 is a partial side view of the toothed belt in the first embodiment according to the present invention.

The toothed belt 10 has a belt body 23. The belt body 23 is provided with a tooth rubber layer 12, a backing rubber layer 22, and a facing fabric 18. The rubber layers 12 and 22 are formed by a rubber. The tooth rubber layer 12 is formed at the top side and the backing rubber layer 22 is formed at the bottom side in this drawing. The tooth rubber layer 12 has a plurality of teeth. The cord 14, extending in the longitudinal direction of the belt 10, is embedded between the tooth rubber layer 12 and the backing rubber layer 22. The outside surface of the tooth rubber layer 12 is covered with the facing fabric 18.

When the tooth belt 10 is wound around a pulley, the outside surface of the facing fabric 18 is a contact face 18a which contacts the pulley. A plurality of pieces of foreign matter 25 which are cone shaped, are embedded at random intervals near the contact face 18a in the toothed belt 10. The plurality of pieces of foreign matter 25 are substantially at equal distances from the contact face 18a. The longitudinal directions of the pieces of foreign matter 25 are substantially perpendicular to the contact face 18a, and the apices of the cones (the pieces of foreign matter 25) point to the contact face 18a. Namely, the width of the pieces of foreign matter becomes narrower as the piece of foreign matter 25 approaches the contact face 18a. Further, for example, the length of the piece of foreign matter 25 is not more than 1 mm, and the width of the piece of foreign matter 25 is about 100 µm.

Figure 2:
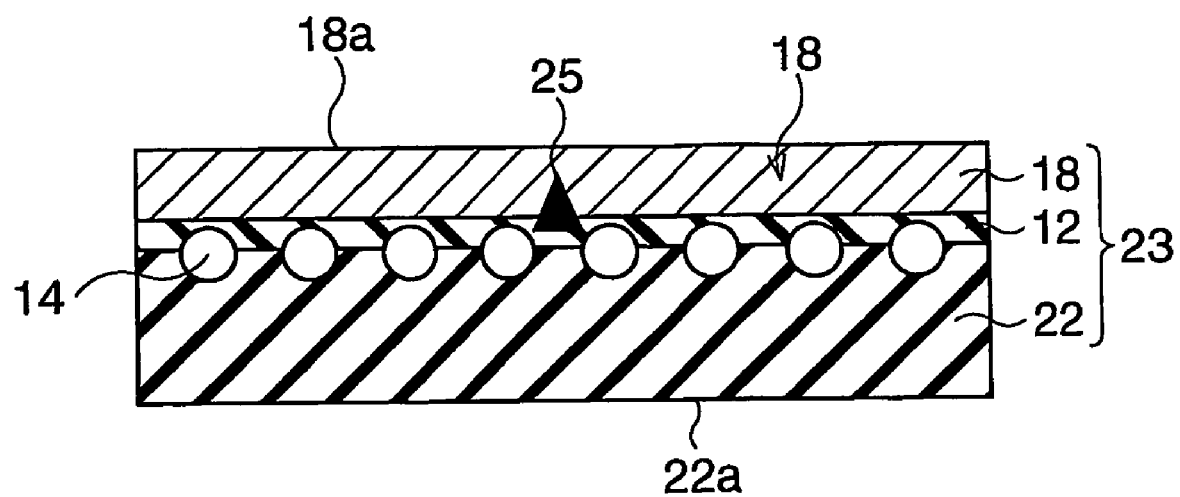
FIG. 2 is a sectional view of the toothed belt at a bottom land in the first embodiment according to the present invention.

FIG. 2 is a sectional view along line II-II of FIG. 1. The foreign matter 25 does not interfere with the cord 14. The base of the cone (the piece of foreign matter 25) is located in the tooth rubber layer 12, and the apex of the cone is located in the facing fabric 18. The distance from the piece of foreign matter 25 to the contact face 18a is shorter than the distance from the piece of foreign matter 25 to an outside surface 22a of the backing rubber layer 22. The outside surface 22a is at the opposite side to the contact face 18a.

The process of production of the toothed belt 10 is explained below. First, the fabric 18, which is coated by a rubber layer and/or an adhesive, is covered around a toothed cylindrical mold, and the cord 14 is wound around the fabric 18. Next, the pieces of foreign matter 25 are knocked into the fabric 18 so as not to interfere with the cord 14. And then a rubber sheet which will become the rubber layers 12 and 22 is covered over the cord 14. The fabrics 18, the cord 14, and rubber sheet are vulcanized and cut to become the toothed belt 10. Due to this, a plurality of the pieces of foreign matter 25 are embedded in the toothed belt 10 or one piece of foreign matter 25 is embedded there in. The plurality of the pieces of foreign matter 25 are embedded at random or at even intervals to each other.

The toothed belt 10 is wound around a pulley (not shown in FIG. 2). The contact face 18a is worn by the pulley when the toothed belt 10 rotates around the pulley. The foreign matter 25 is exposed at the contact face 18a, when the contact face 18a is worn by certain amount. The foreign matter 25 is exposed and then the warning sound is made by the foreign matter 25 contacting the pulley when the toothed belt 10 rotates.

The width of the piece of foreign matter 25 becomes narrower as the piece of foreign matter approaches the contact face 18a. Therefore the area of the foreign matter 25 contacting the pulley becomes larger as the contact face 18a becomes worn and the warning sound becomes louder as the contact face 18a becomes more worn.

As described above, in the first embodiment, the foreign matter is embedded near the contact face in the transmission belt. When the contact face is worn by a certain amount, the transmission belt makes the warning sound while rotating. And if the contact face becomes more worn, the transmission belt will break at a tooth or another area and the transmission belt can not transmit rotational force to pulley. Therefore a user of the transmission belt knows the time when the transmission belt will not transmit rotational force is approaching by the warning sound. Further, the transmission power of the transmission belt on the pulley decreases as the transmission belt becomes more worn. Therefore the user can judge the decrease in the transmission power of the transmission belt on the pulley by the warning sound. Furthermore the warning sound is louder as the contact face becomes more worn, therefore the user can accurately judge the decrease in the transmission power.

In this embodiment, the longitudinal direction of the piece of foreign matter is substantially in a direction perpendicular to the contact face, and the width of the piece of foreign matter becomes narrower as the piece of foreign matter approaches the contact face. Namely, the cross section of the foreign matter becomes smaller as the foreign matter approaches the contact face. Therefore, the foreign matter may be a column which has been cut diagonally, instead of the cone.

Figure 3:
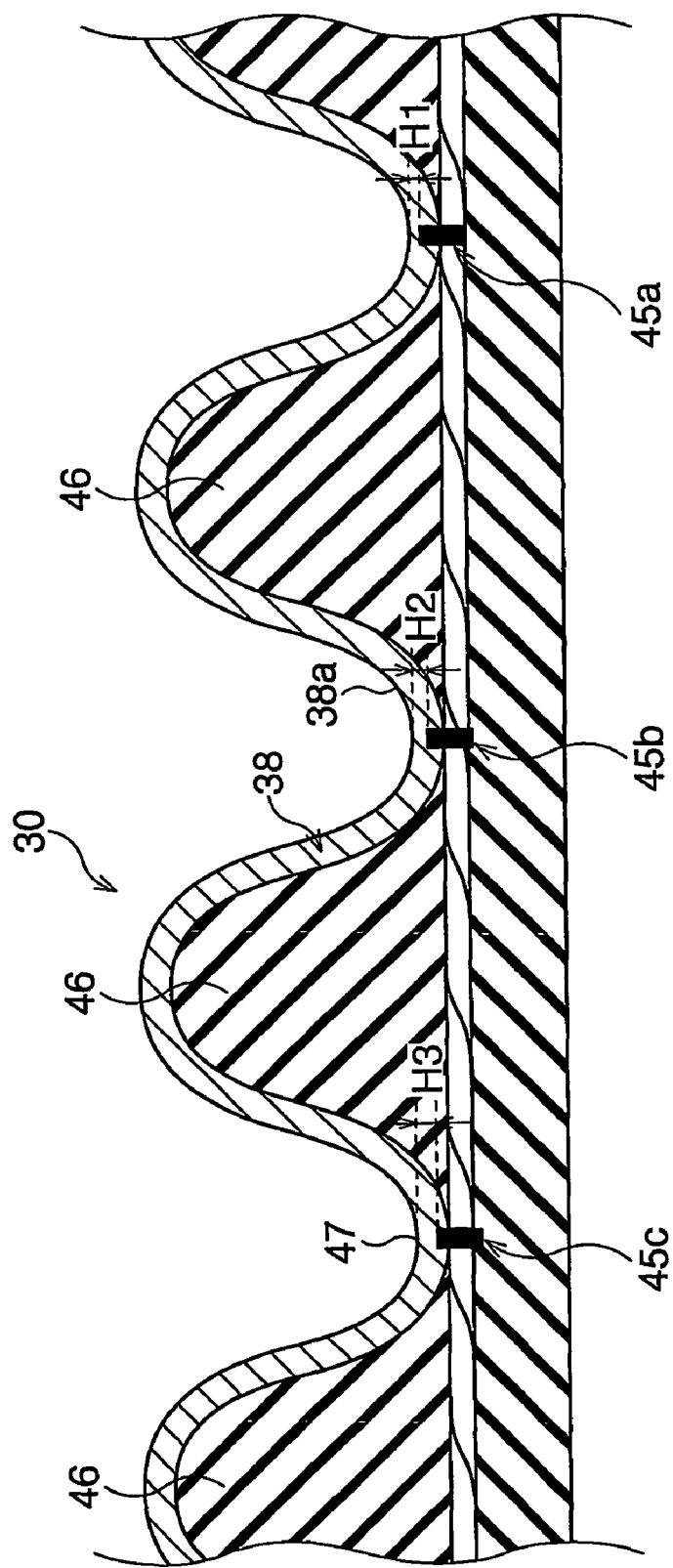
FIG. 3 is a partial side view of the toothed belt in a second embodiment according to the present invention.

FIG. 3 is a partial side view of a toothed belt 30 in a second embodiment according to the present invention. In the first embodiment, the distances between the contact face and the plurality of pieces of foreign matter are substantially same, but in the second embodiment distances between the contact face and the plurality of pieces of foreign matter are different. Further, the shape of the pieces of foreign matter in this embodiment is different from that in the first embodiment. The differences between the second embodiment and the first embodiment will be described next.

The toothed belt 30 has a plurality of teeth 46. A bottom land 47 is formed between the teeth 46. The pieces of foreign matter 45a, 45b, and 45c, which are columns, are embedded in bottom lands 47 of the toothed belt 30. The distances from the contact face 38a to the tops of the pieces of foreign matter 45a, 45b, and 45c are H1, H2 and H3 (in FIG. 3), respectively. H1 is the shortest and H3 is the longest of the three.

When the contact face 38a is worn by a certain amount, first, the piece of foreign matter 45a is exposed at the contact face 38a, and then the piece of foreign matter 45a contacts the pulley, which makes the warning sound while the pulley is rotating. Due to this warning sound, the user of the toothed belt 30 can know when the transmission power of the toothed belt 30 on the pulley has decreased.

When the contact face 38a becomes more worn, not only is the piece of foreign matter 45a exposed, but also the piece of foreign matter 45b is exposed at the contact face 38a. Therefore the exposed area of the foreign matter is larger and the two pieces of foreign matter make a louder warning sound than when only one piece of foreign matter 45a is exposed. Due to this, the user knows the toothed belt 30 has become more worn, and the time until the transmission power will decrease or stop is soon approaching.

When the contact face 38a is worn further, not only are the two pieces of foreign matter 45a and 45b exposed, but also the piece of foreign matter 45c is exposed at the contact face 38a. Therefore the three pieces of foreign matter make a louder warning sound than when the two pieces of foreign matter 45a and 45b are exposed. Due to this, the user knows the toothed belt 30 is worn even more, and the time until the transmission power decreases or stops is rapidly approaching.

Of course, in this embodiment, the pieces of foreign matter can also be embedded in parts of the toothed belt 30 not shown in FIG. 3. But the embodiment shown in FIG. 3 is a typical one, and the pieces of foreign matter should not be embedded in all of the bottom lands 47. Namely, the amount of the foreign matter used is adjusted according to the method of use.

Further, the pieces of foreign matter 45a, 45b and 45c may be embedded in other parts of the toothed belt 30 instead of in the bottom lands 47, similar to first embodiment. Furthermore, the pieces of foreign matter may be a cone or a column which has been cut diagonally, instead of the column.

Described above, in the second embodiment, the distance between the contact face and at least one of the pieces of foreign matter is different from the distance between the contact face and another of the pieces of foreign matter. Due to this, the toothed belt can make the warning sound according to the extent of wear of the toothed belt.

Of course, in the process of the production of the toothed belt in the first and second embodiments, the foreign matter may be knocked into the fabric 18, after only covering the fabric around a toothed cylindrical mold, namely before the cord is wound around the fabric. Furthermore, the foreign matter may be knocked from the bottom side into the toothed belt after vulcanizing.

Figure 4:
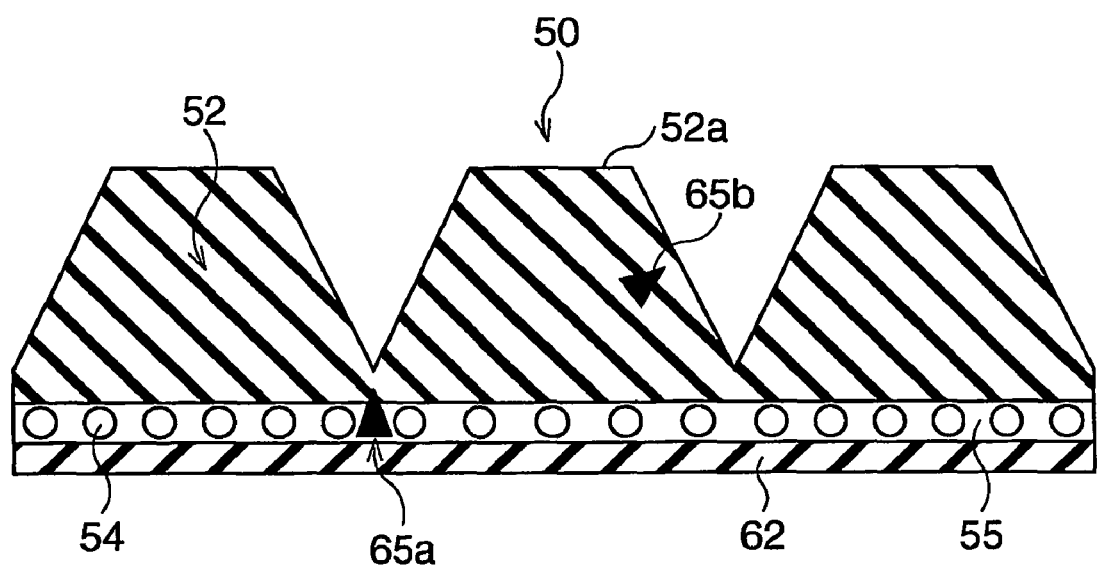
FIG. 4 is a sectional view of the V-ribbed belt in a third embodiment according to the present invention.

FIG. 4 is a sectional view of the V-ribbed belt 50 in a third embodiment according to the present invention. In this embodiment, the important difference from the first and second embodiment is that the transmission belt which has the foreign matter is a V-ribbed belt instead of a toothed belt. The difference from the first and second embodiments will be described next.

The V-ribbed belt 50 has a belt body which is provided with a rib rubber 52 and a back facing fabric 62 (or a backing rubber 62). The rib rubber 52 is formed at the top side and a back facing fabric 62 is formed at the bottom side in this drawing. The rib rubber 52 has a plurality of ribs. A cord 54, extending in the longitudinal direction of the belt 50, is embedded between the rib rubber 52 and the back facing fabric 62 (or the backing rubber 62). Adhesive rubber 55 is placed in close contact with the surface of the cord 54.

When the V-ribbed belt 50 is wound around a pulley, a surface of the rib rubber 52 is a contact face 52a which contacts the pulley. A plurality of pieces of foreign matter 65a and 65b, which are cones, are embedded near the contact face 52a in the ribbed belt 50 at random. The apices of the cones (pieces of foreign matter 65a and 65b) point to the contact face 52a.

In this embodiment, when the pieces of foreign matter 65a and 65b are exposed at contact face 52a, the pieces of foreign matter make the warning sound when the belt is rotating, in a similar way to that in the first and second embodiments.

As described above, the transmission belt is a toothed belt or a V-ribbed belt in the first, second or third embodiment, but the transmission belt may be another type of belt.

Further, the foreign matter does not have to make a sound as long as the foreign matter warns of a decrease in the transmission power of the transmission belt on the pulley. Namely, for example, the foreign matter may appeal to the human sense of sight, when the foreign-matter is exposed at the contact face. For example, the foreign matter is given a color, which is different from a color of other parts of the transmission belt. The other parts are for example the facing fabric and the rubber layer of the transmission belt.

Further, the foreign matter is softer than the pulley so that the foreign matter does not scratch the pulley. The foreign matter may be a metal or a plastic etc.

Figure 5:
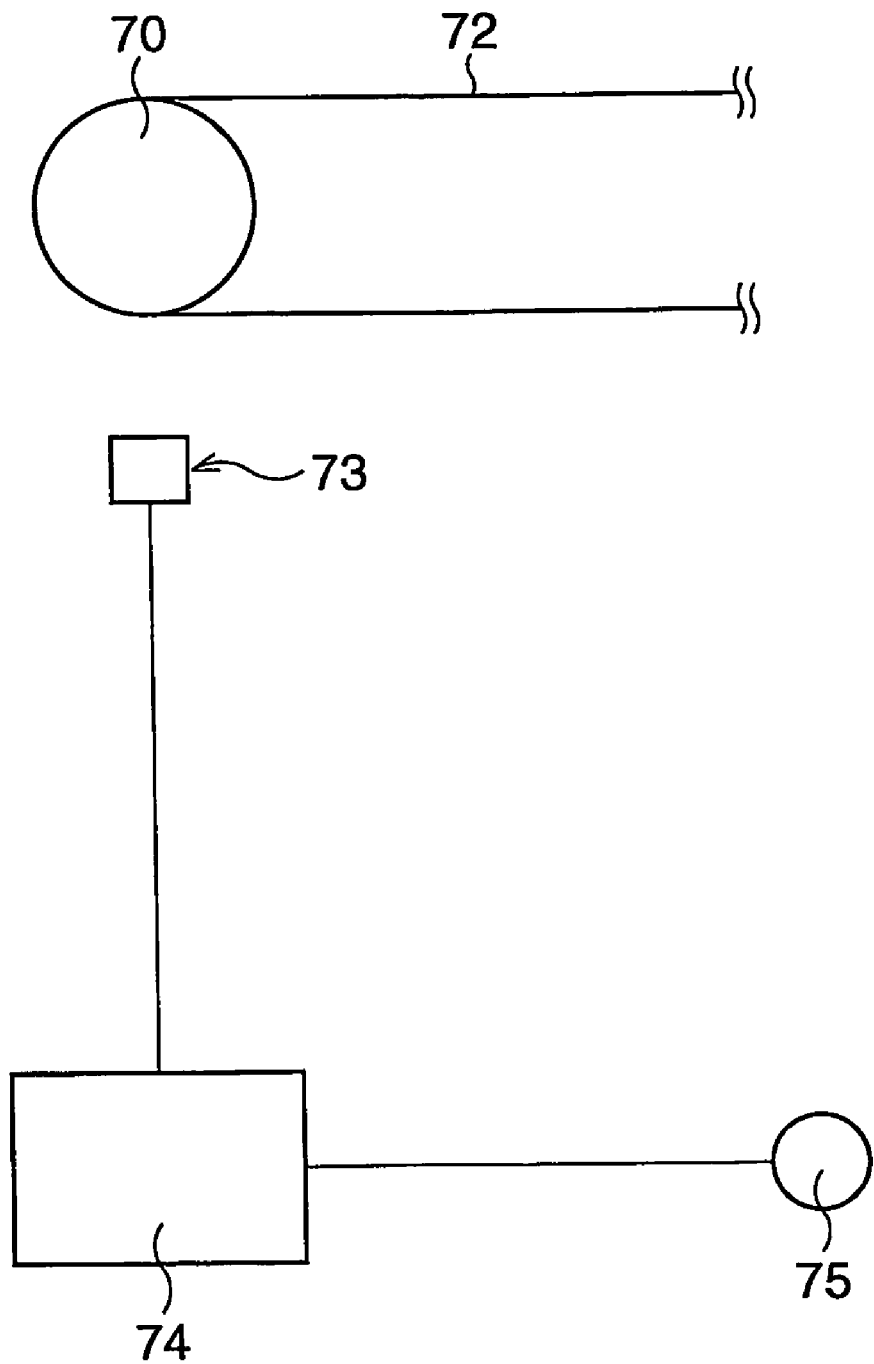
FIG. 5 is a schematic view of an indication apparatus for indicating the end of life of a transmission belt according to the present invention.

FIG. 5 shows a forth embodiment according to the present invention. This embodiment relates to an indication apparatus which can indicate the end of life of a transmission belt. For example, the indication apparatus can be provided in an engine room of a vehicle.

The transmission belt 72 has foreign matter which is embedded near the contact face in a similar way to the first, second and third embodiments. The difference between the transmission belt 72 of this embodiment and those of the first, second, and third embodiments is that the foreign matter makes a sound having a specific frequency when the foreign matter contacts the pulley when the belt is rotating. Other structures of the transmission belt of this embodiment are similar to those of the first, second, and third embodiments. Namely, the sound having the specific frequency which the foreign matter makes becomes louder as the transmission belt 72 becomes more worn.

The transmission belt 72 is wound and rotates around a pulley 70. A microphone 73 (having a sound sensor) is set up near where the transmission belt 73 contacts the pulley 70. The microphone 73 detects a volume of a sound at the specific frequency which the foreign matter makes. The volume of the sound at the specific frequency is changed to a value according to the volume of the sound detected by the microphone 73. The value is sent to a CPU 74.

The CPU 74 has a previously set threshold value which is larger than a value of the specific frequency which the foreign matter makes when the foreign matter is initially exposed at the contact face. The value which is sent to CPU 74 is compared with the threshold, and then a lamp 75 turns on if the value is bigger than the threshold.

The lamp 75 is a warning apparatus which warns a vehicle's driver etc., therefore the lamp 75 is set up where the driver can easily see it (for example on a dashboard). Due to this, the driver can determine the decrease in the transmission power of the transmission belt 72 on the pulley 70. It's preferable that this judgment is made when the sound which the transmission belt 72 makes is stable (for example at idling).

As described above, in this embodiment, the user can easily know if there is a decrease in the transmission power of the transmission belt on the pulley.

Further, the sound data which is compared in the CPU 74 may be a sound pressure instead of a sound volume.

A fifth embodiment will be explained next with regard to the differences from the forth embodiment. In this embodiment, only one piece of foreign matter which is a column is embedded in the transmission belt 72 (referred in FIG. 5).

The transmission belt 72 is worn by a certain amount and then the piece of foreign matter contacts a first engaging part of the pulley 70 and makes a specific sound when the piece of foreign matter is exposed at the contact face. The first engaging part is where the transmission belt 72 first contacts the pulley 70 when the transmission belt 72 is engaged with the pulley 70.

This specific sound is only made by the foreign matter contacting the first engaging part, therefore this specific sound is made only once every one rotation of the belt. Namely, in this embodiment, when the contact face is worn by a certain amount, the foreign matter is exposed at the contact face. Due to this, if the belt 72 rotates at a predetermined speed, the specific sound is made at a predetermined cycle. The specific sound has a volume (sound pressure) which is more than a predetermined amount.

This specific sound is detected by the microphone 73. The sound data of this specific sound is sent to the CPU 74. The CPU 74 instructs the lamp 75 to send out a warning according to the specific sound. Namely, a warning is sent out, if sounds having volumes (sound pressures) which are bigger than a predetermined volume are made at a predetermined cycle for more than predetermined number of times.

As described above, in this embodiment, only if the specific sound is made at the predetermined cycle, is the warning sent out. Therefore, a warning is prevented from occurring erroneously due to a sound other than the sound from the foreign matter contacting the pulley 70.

Further, in this embodiment, a plurality of pieces of foreign matter may be embedded on the same line in the width direction of the belt instead of only one piece of foreign matter.

Due to this, the plurality of pieces of foreign matter contact the pulley 70 at the same time, therefore the specific sound which the plurality of pieces of foreign matter make has a bigger volume than the specific sound which only one pieces of foreign matter makes.

A sixth embodiment will be explained next with regard to the differences from the fifth embodiment. In this embodiment, more than two pieces of foreign matter are arranged in the longitudinal direction of the belt 72 (referred in FIG. 5), and the distance between the contact face and at least one of the pieces of foreign matter is different from a distance between the contact face and another of the pieces of the foreign matter. Due to this, for example, a specific sound is made once during one rotation when the contact face is worn by a certain amount, and then a specific sound is made twice during one rotation when the contact face becomes more worn. The number of specific sounds made during one rotation increases according to the number of the pieces of foreign matter as the contact face becomes more and more worn. In this case, the specific sounds made during one rotation form a predetermined pattern. This predetermined pattern is the same pattern if the extent of the wear of the contact face of the belt 72 is the same.

These specific sounds are detected by a microphone 73. The sound data of these specific sounds is sent to the CPU 74. The CPU 74 instructs the warning apparatus to send out a warning according to the number of the specific sounds made during one rotation or the pattern of the specific sounds made during one rotation. Namely, for example, a level 1 warning is sent out if the specific sound is made once during one rotation of the belt. Further, a level 2 warning is sent out, if the belt 72 is worn more than at level 1, that is to say, the specific sound is made twice during one rotation of the belt 72. Described above, the extent of the wear can be grasped more clearly in the sixth embodiment than in the fifth embodiment.

EXAMPLES

The effects of fifth embodiment will be explained next using examples 1 and 2 and a comparative example. In these examples, the transmission belt 72 (referred in FIG. 5) having the foreign matter was wound around a driving pulley and a driven pulley (the pulley 70), and rotated at 550 rpm. A microphone 73 was set up, having a sound sensor which was located 30 mm from the first engaging part of the pulley 70 with the transmission belt 72. In example 1, the piece of foreign matter was a metal column whose diameter was 3 mm, and only one piece of foreign matter was embedded in a bottom land of the transmission belt 72. In example 2, the piece of foreign matter was a metal column whose diameter was 1.5 mm, and three pieces of foreign matter were embedded on one line in the width direction in a bottom land of the transmission belt 72. In the comparative example, the piece of foreign matter was a metal column whose diameter was 1.5 mm, and only one piece of the foreign matter was embedded in the transmission belt 72.

Further, these example belts were examples for the purpose of proofing the effects of this embodiment, and so were transmission belts having the foreign matter exposed at the contact face in advance before the transmission belts were worn.

Figure 6:
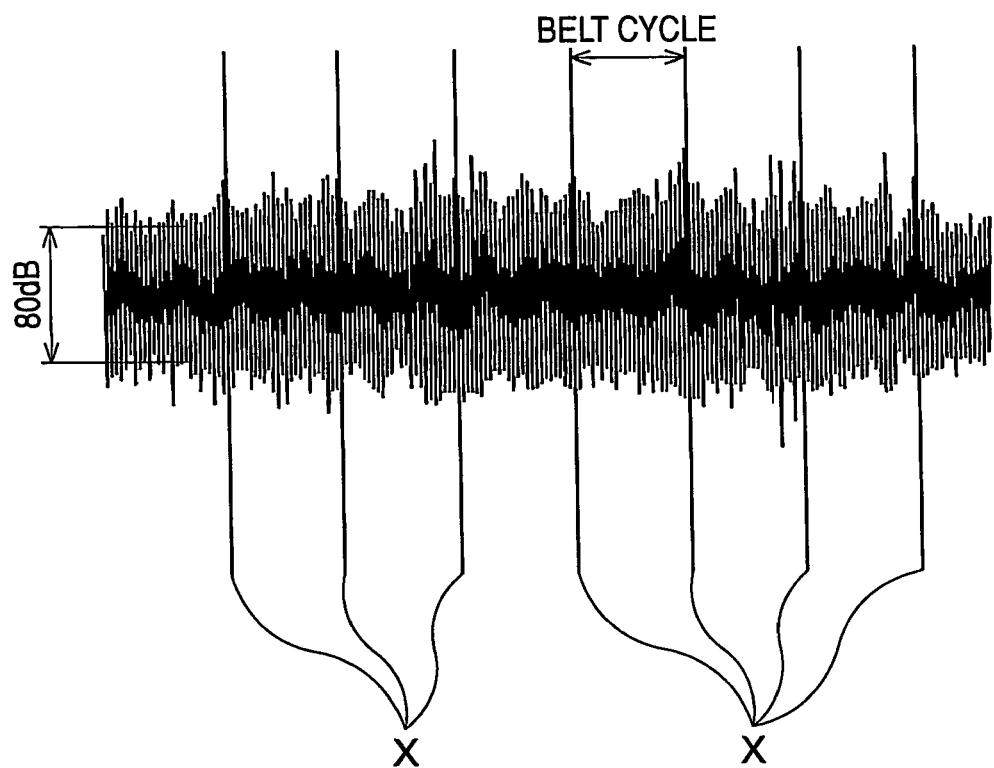
FIG. 6 shows the sound pressure level characteristics of a sound detected by a microphone in an example 1.

The sounds which the microphone 73 detected in example 1 are shown in FIG. 6. This indication apparatus gave specific sounds X besides the sound of about 80 dB which was made all the time by the transmission belt engaged with pulley 70. The volumes (the sound pressures) of these specific sounds X were bigger than the volume (the sound pressures) of the sounds made all the time. The specific sounds were made by the foreign matter contacting the first engaging part of the pulley 70 in the belt 72 every predetermined time (at a predetermined cycle). This predetermined cycle was the same as one rotating cycle of the belt (the belt cycle). Further, in this example, the specific sounds could be heard by the human ear at distance of about 1 m from the indication apparatus.

In example 2, the specific sounds (not shown in the figures) were detected by the microphone 73 in a similar way to that in example 1. Further, in this example, the specific sounds could be heard by the human ear at a distance of about 10 cm from the indication apparatus.

Figure 7:
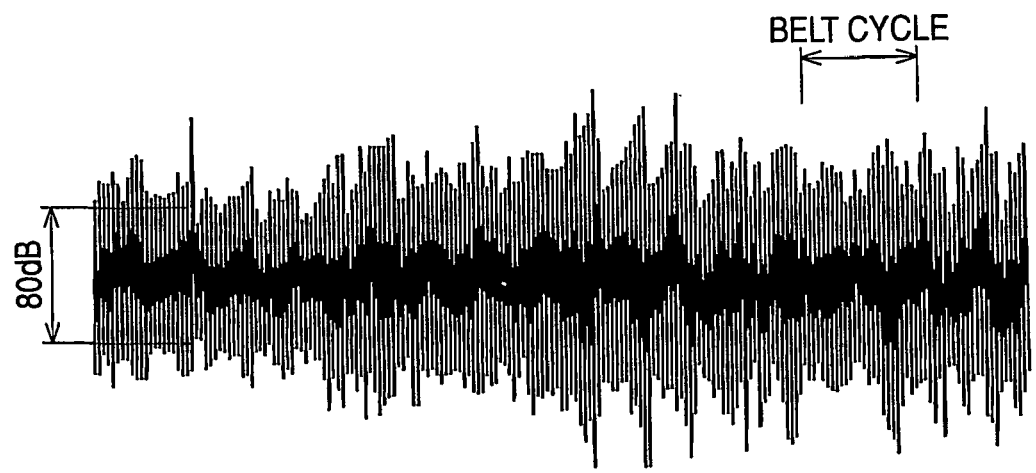
FIG. 7 shows the sound pressure level characteristics of a sound detected by a microphone in a comparative example.

The sounds which the microphone 73 detected in the comparative example are shown in FIG. 7. This indication apparatus gave sounds of about 80 dB which were made all of the time by the transmission belt engaging with pulley 70. But specific sound X which was detected in examples 1 and 2 was not detected in the comparative example. It was thought that the volume of the specific sound which was made by one piece of foreign matter was very small therefore the specific sound was mixed with the sound made all of the time by the transmission belt 72 engaging with pulley 70.

Example 1 and the comparative example show that if only one piece of foreign matter is embedded in the transmission belt, the diameter of the piece of foreign matter needs to be longer than a predetermined diameter (for example more than 1.5 mm), preferably not less than about 3 mm. Further, if the one piece of foreign matter is small, the increase in the number of pieces of foreign matter enables the indication apparatus to make a specific sound which can warn a user as shown in example 2.

Although the embodiments of the present invention have been described herein with reference to the accompanying drawings, obviously many modifications and changes may be made by those skilled in this art without departing from the scope of the invention.

INDUSTRIAL APPLICABILITY

In this way, the transmission belt and an indication apparatus are useful for some apparatuses in most industrial fields, and especially are useful for apparatuses in the engine of a vehicle.

The invention claimed is:
1. A transmission belt comprising:
a contact face contacting with a pulley when said transmission belt is wound around said pulley, and a piece of foreign matter embedded near said contact face and at a distance from said contact face in said transmission belt;

wherein said piece of foreign matter has a longitudinal direction and said longitudinal direction of said foreign matter is substantially in the direction perpendicular to said contact face;

wherein a plurality of pieces of said foreign matter are embedded in said transmission belt, each said piece having a longitudinal direction and a top, and said longitudinal direction substantially in the direction perpendicular to said contact face and with said top closest to said contact face, and each piece having the same length in said longitudinal direction; and a distance in the perpendicular direction between said contact face and the top of at least one piece of said foreign matter being different from a distance in the perpendicular direction between said contact face and the top of another piece of said foreign matter such that upon said contact face being worn by said pulley when said transmission belt rotates around said pulley, then said foreign matter is exposed at said contact face so as to warn of a decrease in the transmission power of said transmission belt on said pulley, wherein said foreign matter contacting said pulley makes a warning sound that becomes louder as said contact face becomes more worn to warn of a decrease in the transmission power.

2. A transmission belt according to claim 1, wherein said foreign matter is softer than said pulley.

3. A transmission belt according to claim 1, wherein said pieces of foreign matter have a cross section of variable width such that the width of said foreign matter is narrower for portions of said foreign matter closer to said contact face and wider for portions of said foreign matter farther from said contact surface.

4. A transmission belt according to claim 1, wherein said pieces of foreign matter are given a color, which is different from a color of other parts of said transmission belt.

5. The indication apparatus of claim 1 wherein said pieces of foreign matter are completely embedded within said transmission belt.

6. An indication apparatus for indicating the end of life of a transmission belt, comprising:
a pulley;
a transmission belt that is wound around said pulley having;
a contact face contacting said pulley when said transmission belt is wound around said pulley; and
a piece of foreign matter embedded near said contact face and at a distance from said contact face in said transmission belt; wherein said piece of foreign matter has a longitudinal direction and said longitudinal direction of said foreign matter is substantially in the direction perpendicular to said contact face;

wherein a plurality of pieces of said foreign matter are embedded in said transmission belt, each said piece having a longitudinal direction and a top, and said longitudinal direction substantially in the direction perpendicular to said contact face and with said top closest to said contact face, and each piece having the same length in said longitudinal direction; and a distance in the perpendicular direction between said contact face and the top of at least one piece of said foreign matter being different from a distance in the perpendicular direction between said contact face and the top of another piece of said foreign matter;

such that upon said contact face being worn by said pulley when said transmission belt rotates around said pulley, then said foreign matter is exposed at said contact face whereby said foreign matter contacting said pulley makes a specific sound;

a sound sensor, which detects said specific sound, set up near where said transmission belt contacts said pulley; and a warning apparatus which sends out a warning according to the volume or sound pressure of said specific sound detected by said sound sensor.

7. An indication apparatus according to claim 6, wherein said foreign matter contacting said pulley at a predetermined cycle makes a specific sound appear at said predetermined cycle when said transmission belt rotates at a predetermined speed.

8. An indication apparatus according to claim 7, wherein said warning apparatus sends out a warning when said specific sound appears at said predetermined cycle.

9. The apparatus of claim 6 wherein said pieces of foreign matter have a cross section of variable width such that the width of said foreign matter is narrower for portions of said foreign matter closer to said contact face and wider for portions of said foreign matter farther from said contact surface.

10. The indication apparatus of claim 6 wherein said pieces of foreign matter are embedded entirely within said transmission belt.

* * * * *